3,121,760
METHOD OF EXTRUDING POLYSTYRENE TUBE
Samuel M. Kline, Monaca, Pa., assignor to Koppers Company, Inc., a corporation of Delaware
Filed Oct. 26, 1961, Ser. No. 147,847
2 Claims. (Cl. 264—51)

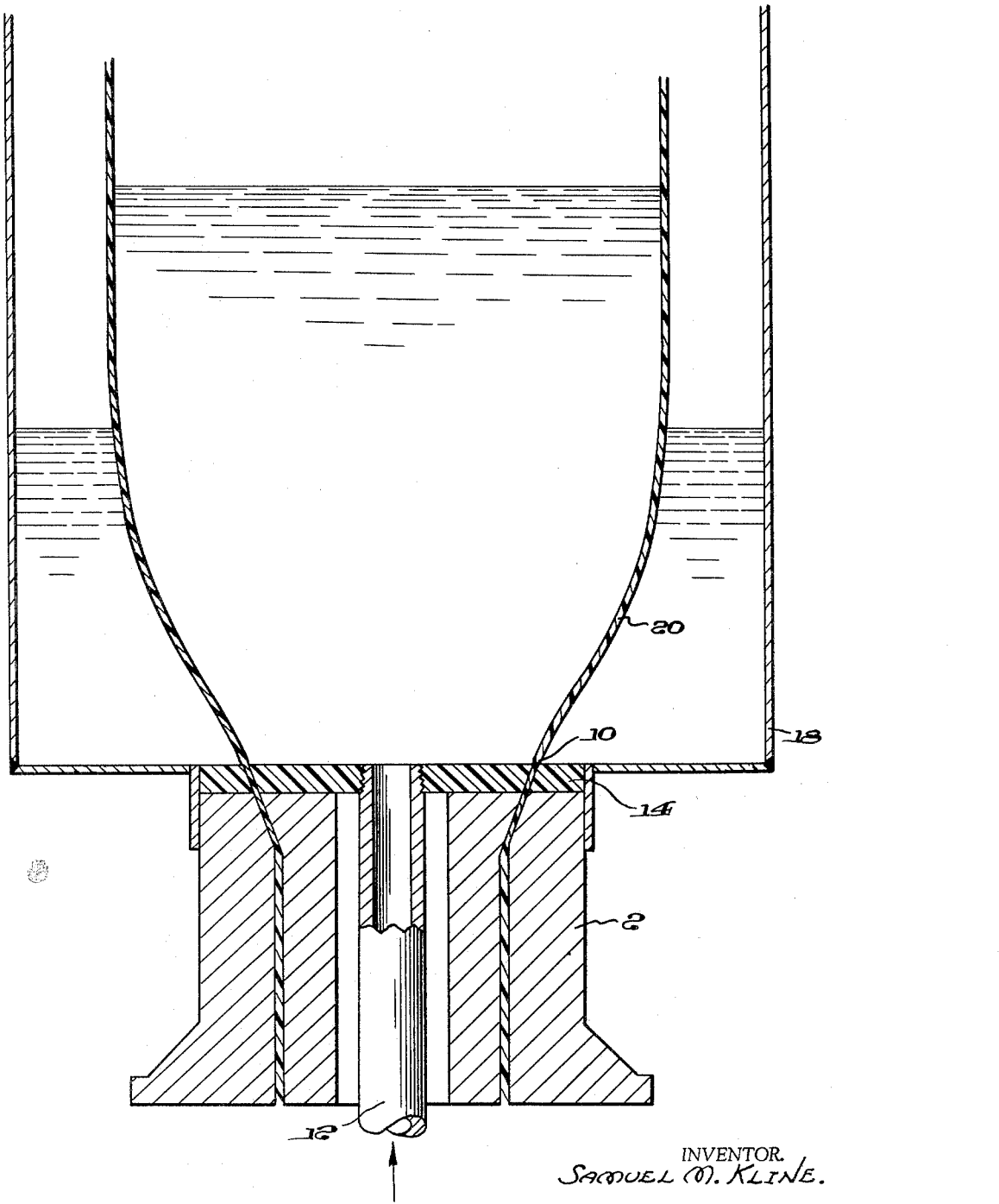

This invention relates to a method of extruding expandable polystyrene to obtain tube of controlled thickness or sheet of controlled width and thickness.

Extrusion is one of the most economical fabricating methods for thermoplastics and is used to produce such items as film, pipe, rod, tubing, etc. In extrusion, thermoplastic material that has been softened by heat or mechanical working is forced through a die into a desired shape. In modern extrusion machines, solid material to be extruded is added to the hopper, then a helical screw receives the material and conveys it along the barrel of the extruder which is heated. The thermoplastic absorbs heat. The combination of heat absorbed from the barrel of the extruder and the heat induced within the material by frictional drag during its passage through the cylinder raises the temperature of the material to a point where the material becomes a plastic mass. This plastic mass is then forced through a die to produce the desired shape, e.g. rod or tube. The extruded plastic issues from the die in a soft and pliable form that is not self-supporting. The material must, therefore, be cooled to set it and render it suitable for further handling.

One application of this extrusion process is in the production of tubing such as from expandable polystyrene. The tubing is generally made by extrusion of the plastic through an annular orifice die.

One type of extrusion used in the manufacturing of thermoplastic tubing, such as expandable polystyrene, is termed the "trapped bubble" process. In this process the soft tubing is supported, and to some extent formed by a specific volume of air that is retained within the tube of extruding plastic by the combination of a set of draw rolls and a valve system capable of injecting air through the die into the extruding tube. Unfortunately, this method is subject to certain inherent drawbacks. For instance, if the air trapped within the tube is disturbed, such as by an imperfection in the tubing which would allow the entrapped air to escape, the size of the tube will vary; the variation being proportional to the excess or deficit of air present in the tube at any particular instant. An additional disadvantage of the trapped bubble technique with respect to expandable polystyrene is that the extruded tubing must be retained in a tubular configuration by pressure of the air within the tube until it has passed through the draw rolls that are under sufficient tension so that only a controlled amount of air is maintained within. The pressure required to exert this tension is sufficient to crush some of the cells of the expanded polystyrene so that a non-uniform product is obtained. Another problem of the prior art processes is that the product tends to be corrugated. This results from a failure to correlate the rate of foam expansion with the rate of bilateral distortion of the extruding foam.

In another method for the production of tubing, draw rolls pull the extruding plastic from the annular orifice die into contact with a forming device of a specific configuration. Generally, this forming device is internally cooled, and during passage over the device the extruding thermoplastic film is caused to cool to a temperature below its softening point. This method, when used with expandable polystyrene, has been found to result in a non-uniform product. Because of the inherent insulating properties of the expandable polystyrene, the rate of cooling is not uniform throughout, e.g. the outside of the tube cooling much slower than the inside. As the tube cools, it shrinks. This differential rate of shrinking causes a non-uniform cell structure through the thickness of the tube. An additional drawback is that the expanding polystyrene tends to adhere to the forming device.

It has now been discovered that a tube of expandable polystyrene of rigidly controlled diameter may be produced by extruding the expandable polystyrene through an annular orifice die in the form of a tube and then passing this tube through a heated liquid bath while maintaining a heated liquid in the extruding tube.

The advantages of the present invention over the processes heretofore used are that it enables extremely low density foam of a rigidly controlled size to be made in a continuous manner without any corrugation.

The above and further objects and novel features of the invention will appear more fully from the following detailed description when the same is read in connection with the accompanying drawing. It is expressly understood, however, that the drawing is not intended as a definition of the invention but is for the purpose of illustration only.

The single sheet of drawing illustrates the apparatus for the production of expandable polystyrene tubing.

In the extrusion of foam polystyrene, the particles of expandable polystyrene are added to the hopper of an extruder (not shown) from whence they are picked up by a helical screw which is driven by an appropriate motor. The particles are forced along the barrel of the extruder and are heated to a plastic state by heat supplied from frictional drag and electric heaters located along the barrel of the extruder. The plastic expandable polystyrene is forced into the die depicted in the drawing. If desired, a torpedo and a breaker plate or other set-up may be used between the extruder barrel and the die. The foregoing is descriptive of conventional extrusion technique as is generally practiced.

In accordance with the novel process of the present invention, the plastic expandable polystyrene is fed into an annular orifice die 2 where it flows out of the annular orifice 10 in a uniform manner. The die is provided with a conduit 12 through which a heated liquid may be injected from a source not shown. In an alternate form the conduit may be replaced by two or more conduits through which the liquid may be circulated. The die is provided with an insulating face layer 14 to maintain at a minimum heat transfer between the liquid and the die. There is in conjunction with the die and contiguous therewith a water-tight container 18. The plastic material exits, in tube form 20, from the die directly into the container where controlled cooling occurs. The extruded tube is cooled passing through the bath. Upon exiting from the bath, the tube may be taken up directly on conventional take-up equipment not shown or it may be further fabricated such as by slitting to form sheet or the sheet may be embossed.

The purpose of extruding into the heated liquid is to maintain the temperature of the expandable thermoplastic at a high enough level to allow expansion to continue. During the treatment, the expandable polystyrene remains soft and pliable. In ordinary extrusion methods, expansion stops as soon as the outer surfaces of the expandable polystyrene becomes hard, that is, their tensile strengths exceed the internal pressure generated by the gaseous expanding agent. Because the expanding polymer cools from the outside to the inside, this limits the degree of expansion to something less than that theoretically possible. Therefore, if the outside of the expanding material is prevented from hardening or setting up, then expansion can continue as long as any blowing agent remains to exert a blowing pressure. Thus, by using this process of extruding into and through a heated liquid, it is possible to obtain an expandable polystyrene of decreased density.

In addition to its natural propensity to expand, expandable polystyrene can be further stretched, i.e. to a larger diameter or thinner section, by the use of pressure. This is done by exerting pressure internal of the expanding tube to force the expanding polymer to a desired shape. As has been mentioned above, this shaping has heretofore been accomplished by use of gas. The use of gas, however, though, is subject to the above-described deficiency of control difficulty.

According to the present invention, rigid control of diameter and thickness is obtained by using a liquid to exert the internal pressure. An advantage of the liquid system is that the liquid may be used to exert the additional pressure to obtain controlled shaping concurrent with expansion. This concurrent expansion and shaping can be obtained by creation of a pressure differential. This pressure differential may be created in two ways. The first is to use the same liquid both inside and outside the tube. In this case, a higher liquid level must be maintained inside the tube than outside. The second method of obtaining the pressure differential is by using a more dense liquid inside the tube than outside. However, the simplest system to use is water with the level being higher inside the tube than outside the tube.

The temperature of the liquid may vary from about 170° to 270° F. Temperatures below 170° are not effective while at temperatures much above 270°, rupturing of cells occurs, to a point where the expandable polystyrene cannot be worked. Maximum expansion, i.e. minimum density, is achieved at about 240° F.

The maximum difference in pressure which can be tolerated depends upon the thickness of the extruding tube; the thicker the tube, the greater the pressure. For a tube extruded from a die having a gap of 0.040 inch, the maximum pressure is in excess of ten inches of water. A pressure greater than this may cause the tube to rupture. Obviously, pressure differences less than this can be used to obtain various degrees of expansion less than maximum.

As has been mentioned above, the liquid through which the tube is extruded is hot, however, it is not necessary generally, to add heat because the liquid absorbs heat from the extruding plastic and maintains its temperature fairly close to that of the extruding plastics.

In addition to water, various other materials may be used in place of water or may be mixed with water. This is generally done in order to obtain particular results. For instance, it is advantageous to use a mixture of water and alcohol because this mixture facilitates the drying of the extruding tube. Many materials can be added to, mixed with or substituted for the water. For example, organic liquids may be added to the water. Such materials are alcohols and polyols, such as, glycerin, methanol, dipropyleneglycol and polyethylene oxide. Ether solutions of water such as, dioxane and tetrahydrofuran may also be used. Solutions of soluble amines, such as, ethylene diamino and amorpholine can be used. These solutions should be predominantly water, otherwise, they would, with the possible exception of glycerin, wet the polymer.

Water solutions of organic solids, such as, urea, triethanolamine phosphate or sodium citrate can be used. It is also possible to use water solutions of inorganic solids. Preferred substances would be the neutral salts of the group IA, IIA and IIIA metals. These materials are particularly attractive since they are non-toxic and include for instance, sodium chloride, potassium bromide, lithium sulfonate and magnesium sulfate. It would also be possible to use some inorganic liquids, such as, silicon tetrachloride, however, materials such as this would have to be kept away from water.

The conditions for the extension of the foam polystyrene vary within a fairly wide range. The cylinder temperature used in the practice of the invention may vary from about 150 to 260° F., the die temperature from 225 to 290° F. and the extrusion rate can be varied according to the machine limits and the type of product desired. The annular passage of the die may vary upwards from 0.01 inch. The extruding polystyrene is drawn according to conventional practices in the art so that it is possible to obtain tubing having a density of less than two pounds per cubic foot with thicknesses from 0.005 inch up to one inch in thickness.

The foregoing has described a new and improved process for the production of extremely low density polystyrene sheet which can be controlled to very close tolerances and in addition overcomes the heretofore troublesome problem of corrugation.

I claim:

1. A method of forming uniform expanded polystyrene tube having a density of not more than about four pounds per cubic foot which comprises upwardly extruding through an annular orifice die expandable polystyrene in tube form into a liquid bath heated to a temperature of from about 170° to about 270° F., said bath being contiguous with said die, and simultaneously maintaining a body of a liquid heated to a temperature of at least 170° F., in the interior of said extruding tube at such level relative to the level of the liquid in said liquid bath to continuously exert an outwardly-directed pressure differential.

2. A method of forming uniform expanded polystyrene tube having a density of not more than about four pounds per cubic foot which comprises upwardly extruding through an annular orifice die expandable polystyrene in tube form into a water bath heated to a temperature of about 200° F., said bath being contiguous with said die, and simultaneously maintaining a body of a liquid heated at a temperature of about 200° F. in the interior of said tube, the body of liquid contained in said tube being at a higher level than the level of the water of said water bath.

References Cited in the file of this patent

UNITED STATES PATENTS

| | | |
|---|---|---|
| 2,448,433 | Irons et al. | Aug. 31, 1948 |
| 2,717,424 | Francis et al. | Sept. 13, 1955 |
| 2,774,991 | McCurdy et al. | Dec. 25, 1956 |
| 2,987,768 | Given | June 13, 1961 |
| 2,987,776 | Miller et al. | June 13, 1961 |
| 3,022,543 | Baird et al. | Feb. 27, 1962 |